United States Patent
Hathorn et al.

(10) Patent No.: US 8,005,082 B2
(45) Date of Patent: Aug. 23, 2011

(54) CONCURRENT ENABLEMENT OF PERSISTENT INFORMATION UNIT PACING

(75) Inventors: Roger Gregory Hathorn, Tucson, AZ (US); Bret Wayne Holley, Tucson, AZ (US); Matthew Joseph Kalos, Tucson, AZ (US); Louis William Ricci, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 355 days.

(21) Appl. No.: 12/245,608

(22) Filed: Oct. 3, 2008

(65) Prior Publication Data

US 2010/0086077 A1  Apr. 8, 2010

(51) Int. Cl.
*H04L 12/28* (2006.01)

(52) U.S. Cl. ........ 370/389; 370/235; 370/236; 370/371; 370/383; 370/399; 710/20; 710/21; 710/29; 710/34

(58) Field of Classification Search .................. 370/235, 370/236, 371, 383, 397, 399, 437, 438; 710/20, 710/21, 29, 34
See application file for complete search history.

(56) References Cited

U.S. PATENT DOCUMENTS

| | | | | |
|---|---|---|---|---|
| 5,526,484 A * | 6/1996 | Casper et al. | ................ | 709/237 |
| 6,185,631 B1 * | 2/2001 | Casper et al. | ................ | 710/20 |
| 6,687,766 B1 * | 2/2004 | Casper et al. | ................ | 710/20 |
| 6,920,537 B2 * | 7/2005 | Ofek et al. | ................ | 711/163 |
| 7,039,693 B2 * | 5/2006 | Driever et al. | ................ | 709/221 |
| 7,130,938 B2 * | 10/2006 | Brice et al. | ................ | 710/62 |
| 7,539,209 B2 * | 5/2009 | Pelley | ................ | 370/468 |
| 2004/0177153 A1 * | 9/2004 | Pelley | ................ | 709/236 |
| 2004/0193968 A1 * | 9/2004 | Dugan et al. | ................ | 714/57 |
| 2008/0059638 A1 | 3/2008 | Hathorn et al. | | |
| 2008/0123681 A1 | 5/2008 | Hathorn et al. | | |
| 2009/0144464 A1 | 6/2009 | Hathorn et al. | | |

OTHER PUBLICATIONS

"Fibre Channel Single-Byte Command Code Sets-3 Mapping Protocol (FC-SB-3) Rev. 1.6", NCITS working draft proposed American National Standard for Information Technology, Mar. 26, 2003, pp. 1-206.

"Fibre Channel Link Services (FC-LS) Rev. 1.62", NCITS working draft proposed American National Standard for Information Technology, Dec. 6, 2006, pp. 1-210.

"Fibre Channel Single-Byte Command Code Sets Amendment 1 (FC-SB-3/AM1) Rev. 1.03", NCITS working draft proposed American National Standard for Information Technology, Feb. 7, 2007, pp. 1-23.

\* cited by examiner

*Primary Examiner* — Ayaz R Sheikh
*Assistant Examiner* — Andrew C Lee
(74) *Attorney, Agent, or Firm* — Rabindranath Dutta; Konrad Raynes & Victor LLP

(57) ABSTRACT

Provided are a method, system, and article of manufacture, in which a logical path is established between a control unit and a channel over a fiber channel connection. Code for persistent information unit pacing is loaded into the control unit and the channel. An indicator is set in node descriptors of the control unit and the channel to indicate concurrent enablement of persistent pacing while retaining the established logical path between the control unit and the channel.

20 Claims, 10 Drawing Sheets

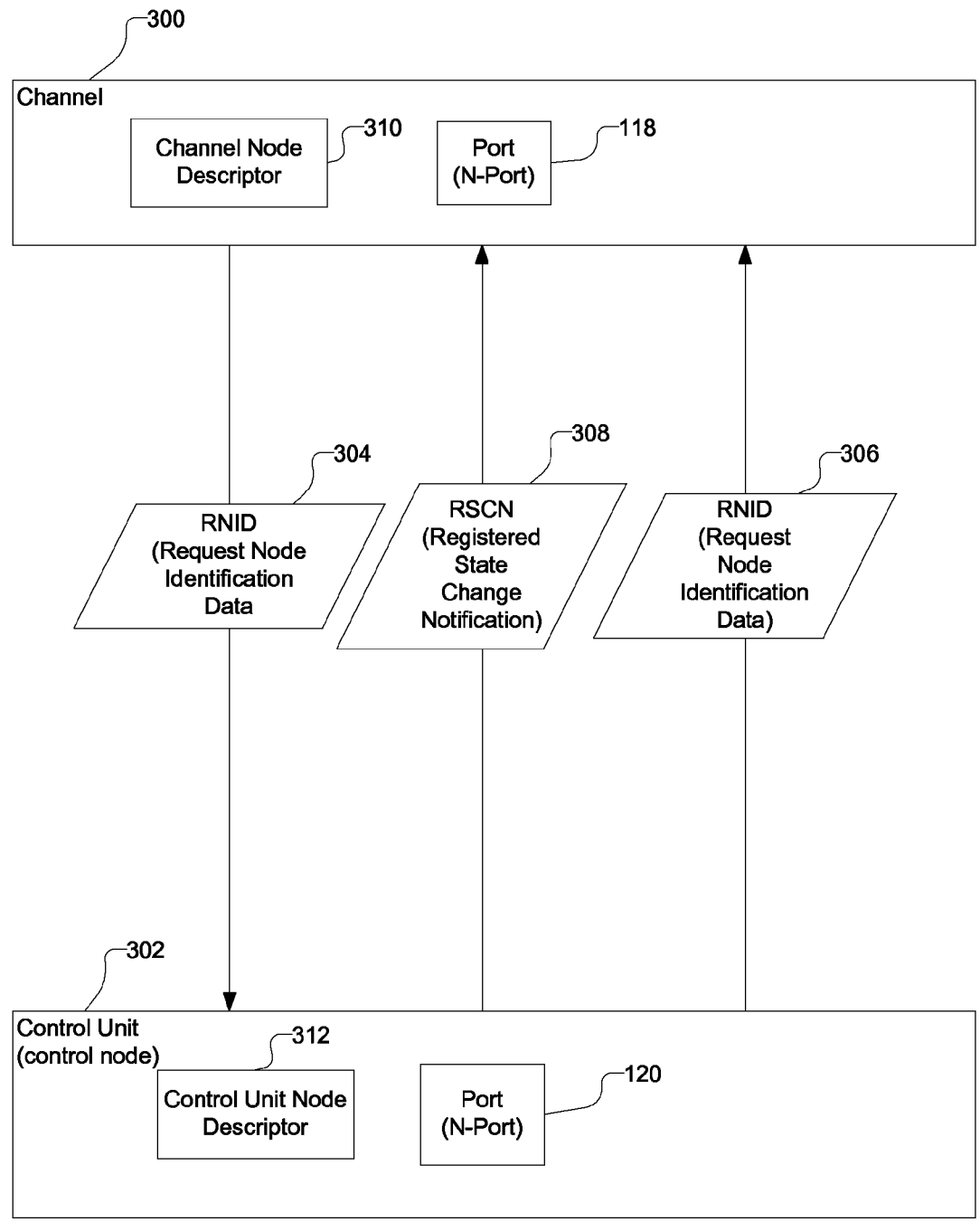

FIG. 4

6.3.8.2 Specific Node-Identification Data —400    —406
...

When bit 3 of the flag field is zero, indicating that this is a device-type node, the contents of bytes 1-3 of word 0 shall be as follows:

Byte   Description
1      Bits 0-2 of byte 1 contain a code that shall specify the interface protocol type of the interface identified by the node descriptor. The codes and their meanings are as follows:

Value Meaning
    0 Reserved.
    1 FC-SB-2 and updates
    2 Other FC-4s including FCP and updates
    3 FC-SB-2 and updates; other FC-4s including FCP and updates
    4 FC-4 support not specified (This shall not be used if another value applies.)
    5-6 Reserved
    7 Vendor-specific A fabric which supports the fabric requirements for FC-SB-4 shall use code 1 or 3. See clause 6.3.10.1.

Bit 3, when one, indicates that the node supports FC-SB-4 process login using the process login (PRLI) extended link service. When zero, the node does not support FC-SB-4 process login.

Bits 4-6 of byte 1 shall be reserved.
    Bit 7, when one indicates that the node supports concurrent enablement of the persistent pacing function. When zero, the node does not support concurrent enablement of persistent pacing.    —408
    ....
        402

When bit 3 of the flag field is one, indicating that this is a CPC-type node, the contents of bytes 1-3 of word 0 shall be as follows:

Byte   Description
1      Type. When the class field contains a value other than 1, byte 1 of word 0 shall be reserved and set to zeros.

When the class field contains a value of 1, byte 1 of word 0 shall be defined as follows:

Bits 0-2 contain a code that specifies the interface protocol type of the interface identified by the node descriptor. The codes and their meanings shall be as follows:

Value Meaning
    0 Reserved.
    1 FC-SB-2 and updates
    2 Other FC-4s including FCP and updates
    3 FC-SB-2 and updates; other FC-4s including FCP and updates
    4 FC-4 support not specified (This shall not be used if another value applies.)
    5-6 Reserved
    7 Vendor-specific Bit 3, when one, indicates that the node supports FC-SB-4 process login using the process login (PRLI) extended link service. When zero, the node does not support FC-SB-4 process login.
        —404
    Bits 4-6 of byte 1 shall be reserved.
    Bit 7, when one indicates that the node supports concurrent enablement of the persistent pacing function. When zero, the node does not support concurrent enablement of persistent pacing.

US 8,005,082 B2

CONCURRENT ENABLEMENT OF PERSISTENT INFORMATION UNIT PACING

BACKGROUND

1. Field

The disclosure relates to a method, system, and article of manufacture for the concurrent enablement of persistent information unit pacing.

2. Background

Fibre Channel refers to an integrated set of architectural standards for data transfer being developed by the American National Standards Institute. Fibre Connection (FICON) is a protocol of the fibre channel architecture and may also be referred to by the formal name of FC-SB-3. Further details of FC-SB-3 may be found in the publication, "FIBRE CHANNEL Single-Byte Command Code Sets-3 Mapping Protocol (FC-SB-3)", Rev. 1.6, published by the American National Standards for Information Technology on Mar. 26, 2003.

A channel is a direct or a switched point-to-point connection between communicating devices. In the Fibre Channel architecture, a FICON channel may perform the functions specified by FC-SB-3 to provide access to Input/Output (I/O) devices by means of control units or emulated control units. FICON channels may rely on packet switching for transferring data between communicating devices. In FC-SB-3, a channel may also be referred to as an entity, typically of a host computer, which includes one N_Port and elements which perform the functions specified by FC-SB-3 to provide access to I/O devices by means of control units or emulated control units. Also, in FC-SB-3, a control unit may comprise a physical or emulated entity that includes at least one N_Port and elements which adapt the characteristics of one or more I/O devices to allow the attachment of the I/O devices to the N_Port of a channel.

A channel command word (CCW) is a control block which includes an I/O request, and may refer to a structure of a specific system architecture which specifies a command to be executed along with parameters. A channel program is a sequence of one or more channel command words executed sequentially that controls a specific sequence of channel operations. FICON channels may in certain situations transmit up to sixteen channel command words at a time along with the associated data for any write operations, where a channel command word may be referred to as an "information unit" (IU).

The IU pacing protocol, as defined in the FICON architecture, has the limitation that the first burst of information units from the channel to the control unit may be no larger than a default value of 16. This may cause a delay in the execution of channel programs with more than 16 commands at large distances, such as distances of over a hundred kilometers (or at shorter distances as link speeds increase), because a round trip to the control unit may be needed before the remainder of the information units can be sent by the channel to the control unit. A control unit can adjust the value of the IU pacing parameter in the command response information unit, to modify the flow of information units within the FICON architecture, such that more than sixteen information units can be in flight at any point in time.

In FC-SB-3, a change in the IU pacing parameter remains in effect until the end of the current command chain or channel program. Certain published amendments to FC-SB-3 allow the pacing parameter to be persistent and remain in effect for any new command chains on the logical path. Such amendments to FC-SB-3 allow the FICON channel to retain a pacing count that can be used at the start of execution of a channel program. This may improve the performance of I/O programs at distances of over a hundred kilometers (or at shorter distances as link speeds increase) by allowing a channel to send the entire channel program to the control unit and by eliminating the delay of waiting for the first command response information unit. The channel retains the pacing count value, presented by the control unit in accordance with FC-SB-3, and uses that pacing count value as the new default pacing count for any new channel programs issued on the same logical path. Further details of allowing persistent IU pacing parameter in FC-SB-3 may be found in the publication "FIBRE CHANNEL Single-Byte Command Code Sets AMENDMENT1 (FC-SB-3/AM1)", Rev. 1.02, published by the American National Standards for Information Technology on Feb. 7, 2007.

In Fibre Channel an extended link service (ELS) request solicits a destination port to perform a function. An ELS reply is transmitted in response to an ELS request, unless otherwise specified. A registered state change notification (RSCN) ELS may be sent to registered ports, in response to an occurrence of an event. A request node identification data (RNID) ELS is an ELS for acquiring node identification data. Extended link services for FICON may also be referred to as FC-LS and further details may be found in the publication "Fibre Channel Link Services (FC-LS)", Rev. 1.62, published by the American National Standard for Information Technology on Dec. 4, 2006.

SUMMARY OF THE DESCRIBED EMBODIMENTS

Provided are a method, system, and article of manufacture, in which a logical path is established between a control unit and a channel over a fibre channel connection. Code for persistent information unit pacing is loaded into the control unit and the channel. An indicator is set in node descriptors of the control unit and the channel to indicate concurrent enablement of persistent pacing while retaining the established logical path between the control unit and the channel.

In additional embodiments, the indicator is a reserved bit in a specific node identification data corresponding to a device-type node and a CPC-type node, wherein the device type node corresponds to the control unit and the CPC-type node corresponds to the channel, wherein the CPC-type node is a central-processor-complex-type node.

In yet additional embodiments, in response to the code for enabling persistent information unit pacing being loaded into the control unit, the channel is triggered by the control unit to read a control unit node descriptor of the control unit. Additionally, in response to the code for enabling persistent information unit pacing being loaded into the channel, the control unit is triggered by the channel to read a channel node descriptor of the channel.

In further embodiments, a generation is made of a request node identification data (RNID) initiative to the control unit. The control unit generates an RNID to the channel, in response to receiving a request for the RNID from the channel with which the control unit has an already established logical path.

In certain embodiments, the indicator is a concurrent persistent information unit pacing enablement (CPE) bit. In response to the channel detecting that the CPE bit is set in a control unit node descriptor, the channel enables persistent pacing of information units for all currently established logical paths with the control unit corresponding to the control unit node descriptor. Additionally, in response to the control unit detecting that the CPE bit is set in the channel node descriptor, the control unit enables persistent pacing of information units for all currently established logical paths with the channel corresponding to the channel node descriptor.

BRIEF DESCRIPTION OF THE DRAWINGS

Referring now to the drawings in which like reference numbers represent corresponding parts throughout:

FIG. 3 illustrates communications between a channel and a control unit, in accordance with certain embodiments;

FIG. 4 illustrates certain selected modifications to versions of the FC-SB-3 standard, in accordance with certain embodiments;

DETAILED DESCRIPTION

In the following description, reference is made to the accompanying drawings which form a part hereof and which illustrate several embodiments. It is understood that other embodiments may be utilized and structural and operational changes may be made.

Concurrent Enablement of the Persistent IU Pacing

A logical path as defined by FC-SB-3 is the relationship established between a channel image of a channel and a control unit image of the control unit, where the logical path identifies a communication path over which device-level information may be transferred. Persistent IU Pacing is enabled using a control bit in an Establish Logical Path (ELP) link-control function. Logical path establishment (ELP) is performed during FICON link initialization when a device is first installed or powered on. Once logical paths are established between a channel and a control unit, it may be desirable to keep the logical paths established. A re-establishment of logical paths may cause system resets and may also cause a significant number of operating system level recovery and path validation to be performed.

When new software or microcode or firmware is installed in a control unit or a channel host adapter, it is installed "concurrently", i.e., without removal and re-establishment of logical paths. When installing software that includes support for the Persistent IU Pacing function defined in the publication "FIBRE CHANNEL Single-Byte Command Code Sets AMENDMENT1 (FC-SB-3/AM1)", Rev. 1.02, published by the American National Standards for Information Technology on Feb. 7, 2007, there is no existing mechanism to enable the persistent IU pacing function using ELP without causing removal and re-establishment of logical paths.

Certain embodiments allow concurrent enablement of Persistent IU Pacing on existing logical paths without causing re-establishment of logical paths. In certain embodiments, a new bit is defined in the FICON Node descriptor that signals support for Concurrent Persistent IU Pacing Enablement (CPE) and some rules are provided that triggers an initiative to exchange FICON node descriptors when new software that supports the persistent IU pacing function is loaded. When a channel detects the setting of the CPE bit in the control unit node descriptor, the channel enables Persistent IU Pacing for all currently established logical paths with that control unit node. When a control unit detects the setting of the CPE bit in the channel node descriptor, the control unit enables Persistent IU Pacing for all currently established logical paths with that channel node.

Exemplary Embodiments

Figure 1:
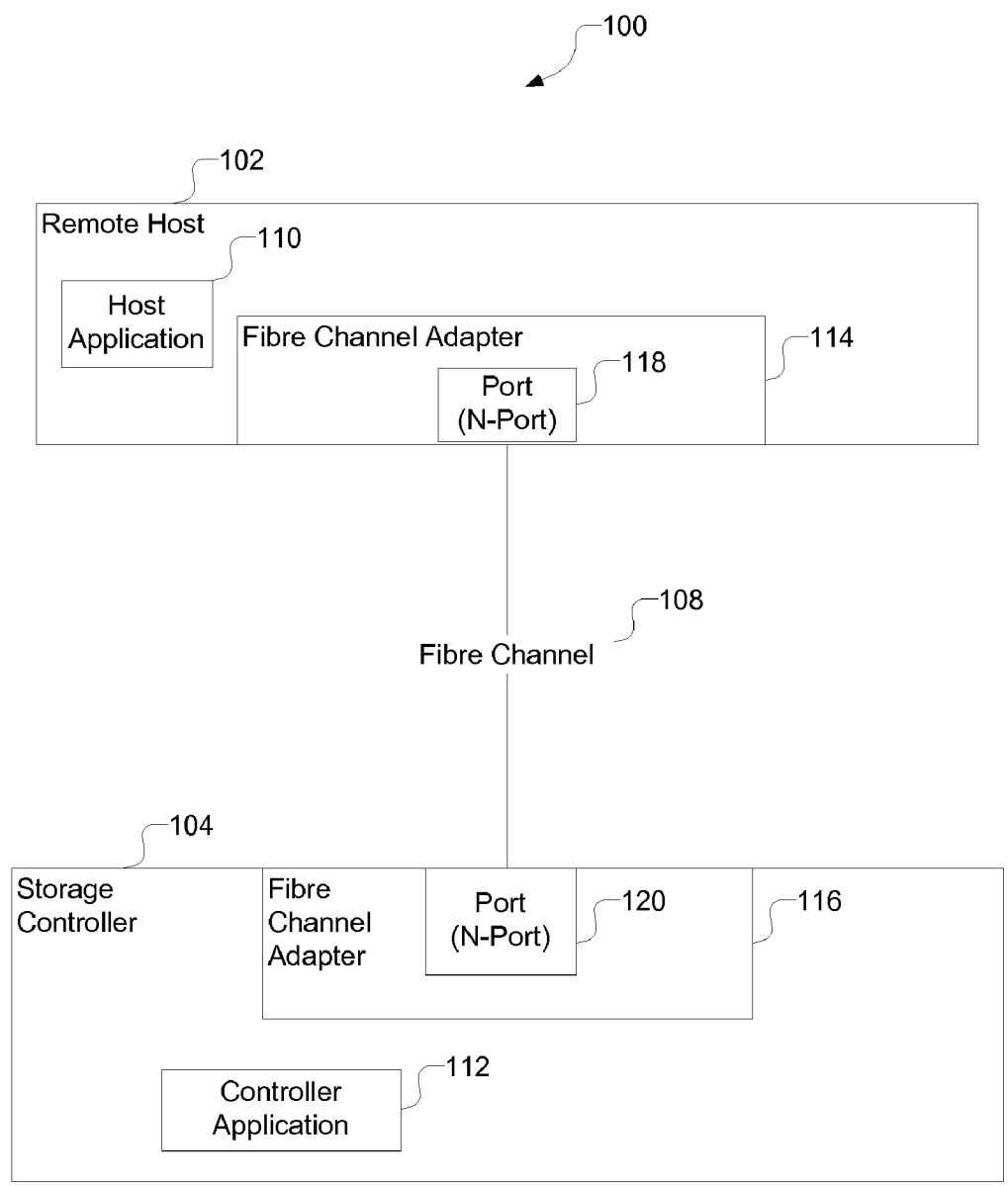
FIG. 1 illustrates a block diagram of a computing environment in accordance with certain embodiments.

FIG. 1 illustrates a block diagram of a computing environment 100 utilizing a remote host 102 coupled to a storage controller 104. While FIG. 1 shows only a single remote host 102 and a single storage controller 104, in certain alternative embodiments a plurality of remote hosts may be coupled to a plurality of storage controllers or other I/O units.

The remote host 102 may connect to the storage controller 104 through a data interface channel, such as fibre channel 108 or any other data interface mechanism known in the art. The remote host 102 may be any suitable computational device presently known in the art, such as a personal computer, a workstation, a server, a mainframe, a hand held computer, a telephony device, a network appliance, etc. The remote host 102 may include any operating system known in the art, such as, the IBM OS/390* or the z/OS* operating system.

*z/OS and OS/390 are trademarks or registered trademarks of International Business Machines Corporation.

The remote host 102 may include a host application 110 and the storage controller 104 may include a controller application 112. The host application 110 may interface with the controller application 112 to access and manipulate data stored by the storage controller 104. The host application 110 and the controller application 112 communicate over the fiber channel 108.

Communications over the fibre channel 108 between the remote host 102 and the storage controller 104 may be enabled by a fibre channel adapter 114 included in the remote host 102 and a fibre channel adapter 116 included in the storage controller 104. The fibre channel adapter 114 included in the remote host 102 includes a port 118, and the fibre channel adapter 116 included in the storage controller 104 includes a port 120, where the ports 118 and 120 may be referred to as N-ports in fibre channel terminology. Fibre channel based communications via the FICON protocol may be performed between the port 118 of the remote host 102 and the port 120 of the storage controller 104. In the FC-SB-3 terminology, the port 118 may be included in a channel of the remote host and the port 120 may be referred to as being included in a control unit. Logical paths may be established between the channel and the control unit for communications.

Therefore, FIG. 1, illustrates a computing environment 100 in which the host application 110 accesses and manipulates data in the storage controller 104 via the FICON protocol.

Figure 2:
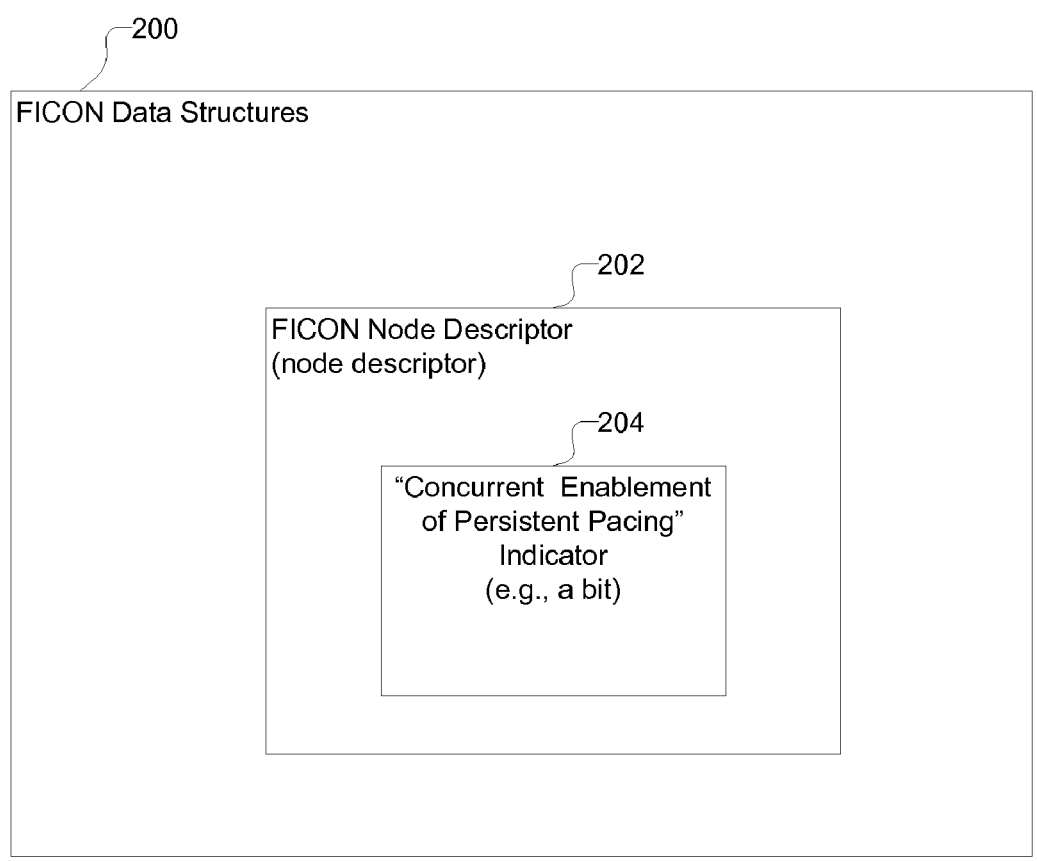
FIG. 2 illustrates a block diagram that shows data structures associated with a fibre channel connection, in accordance with certain embodiments.

FIG. 2 illustrates data structures associated with a fibre connection implemented over the fibre channel 108 in the computing environment 100, in accordance with certain embodiments. The data structures shown in FIG. 2 are referred to as FICON data structures 200.

The FICON data structures 200 include a FICON node descriptor 202 that describes the physical characteristics and location of a port. In certain embodiments, the FICON node descriptor 202 is augmented with an indicator 204 referred to as the concurrent enablement of persistent pacing indicator. In certain embodiments the concurrent enablement of persistent pacing indicator 204 is implemented by a bit that can be set to 1 or 0. In certain embodiments, when software, firmware or microcode for persistent IU pacing is loaded on the fibre channel adapters 114, 116, the concurrent enablement of persistent pacing indicator is set to 1, and certain embodiments provide a mechanism by which already existing established logical paths do not have to be re-established.

Therefore, FIG. 2 illustrates certain embodiments in which an indicator referred to as a concurrent enablement of persistent pacing indicator 204 indicates whether or not a concurrent enablement of persistent pacing is allowed. In certain embodiments, the indicator 204 is included as an enhancement to a fibre channel protocol, wherein the enhancement to the fibre channel protocol supports concurrent enablement of persistent information unit pacing.

FIG. 3 illustrates a block diagram that shows communications between a channel 300 and a control unit 302 implemented in the computing environment 100, in accordance with certain embodiments.

In certain embodiments, the channel 300 is an entity of the remote host 102, and includes the port 118. The control unit 302 is an entity of the storage controller 104 and includes the port 120. A logical path may be established between the channel 300 and the control unit 302 via an establish logical path (ELP) request and a logical path established (LPE) response.

In certain embodiments, the channel 300 is capable of sending a request node identification data (RNID) 304 and associated requests to the control unit 302 requesting node identification data from the control unit 302. The control unit 302 is also capable of sending a RNID 306 and associated requests to the channel 300. Additionally, the control unit 302 is also capable of sending a registered state change notification (RSCN) 308 to the channel 300. Further details of RNID and RSCN may be found in the publication "Fibre Channel Link Services (FC-LS)", Rev. 1.62, published by the American National Standard for Information Technology on Dec. 4, 2006

In certain embodiments, when code for implementing the Persistent IU Pacing function is installed on the channel 300 and the control unit 302, then certain embodiments use the RNID 304, 306 and RSCN 308 in association with the concurrent enablement of IU Pacing indicator 204, to allow persistent IU pacing without re-establishing already existing logical paths. The channel 300 and the control unit 302 may include a channel node descriptor 310 and a control unit node descriptor 312 respectively, wherein the channel node descriptor 310 and the control unit node descriptor 312 each include the concurrent enablement of persistent pacing indicator 204 in accordance with the FICON data structures 200 described in FIG. 2.

FIG. 4 illustrates certain embodiments in which certain selected modifications are made to the INCITS Fibre Channel Standard FC-SB-3 Rev 1.6. The selected modifications in section 6.3.8.2 of FC-SB-3 Rev 1.6 that describe specific node-identification data (reference numeral 400) are shown via underlinings and bold font in FIG. 4. FIG. 4 may also include other additional modifications that do not pertain to the embodiments described herein.

In effect, certain embodiments modify the FC-SB-3 standard such that bit 7 (shown via reference numerals 402, 404) when one indicates that the node supports concurrent enablement of the persistent pacing function. When zero, the node does not support concurrent enablement of persistent pacing. Bit 7 (reference numerals 402, 404) shown in FIG. 4 may correspond to the concurrent enablement of persistent pacing indicator 204 shown in FIG. 2. It should be noted that the device-node 404 of FIG. 4 corresponds the control node 302 in FIG. 3 and the Central-Processor-Complex (CPC) type node 408 of FIG. 4 corresponds to the channel node 300 of FIG. 3.

Therefore, in certain embodiments an indicator 204, such as a bit (e.g., bit 7 indicated via reference numerals 402, 404), is used to indicate support for concurrent enablement of persistent information unit pacing. The indicator 204 is set in a node descriptor 202 in the channel when code for implementing persistent IU Pacing is loaded in the channel 300, and the indicator 204 is set in a node descriptor 202 in the control unit 302 when code for implementing persistent IU Pacing is loaded in the control unit 302.

Figure 5:
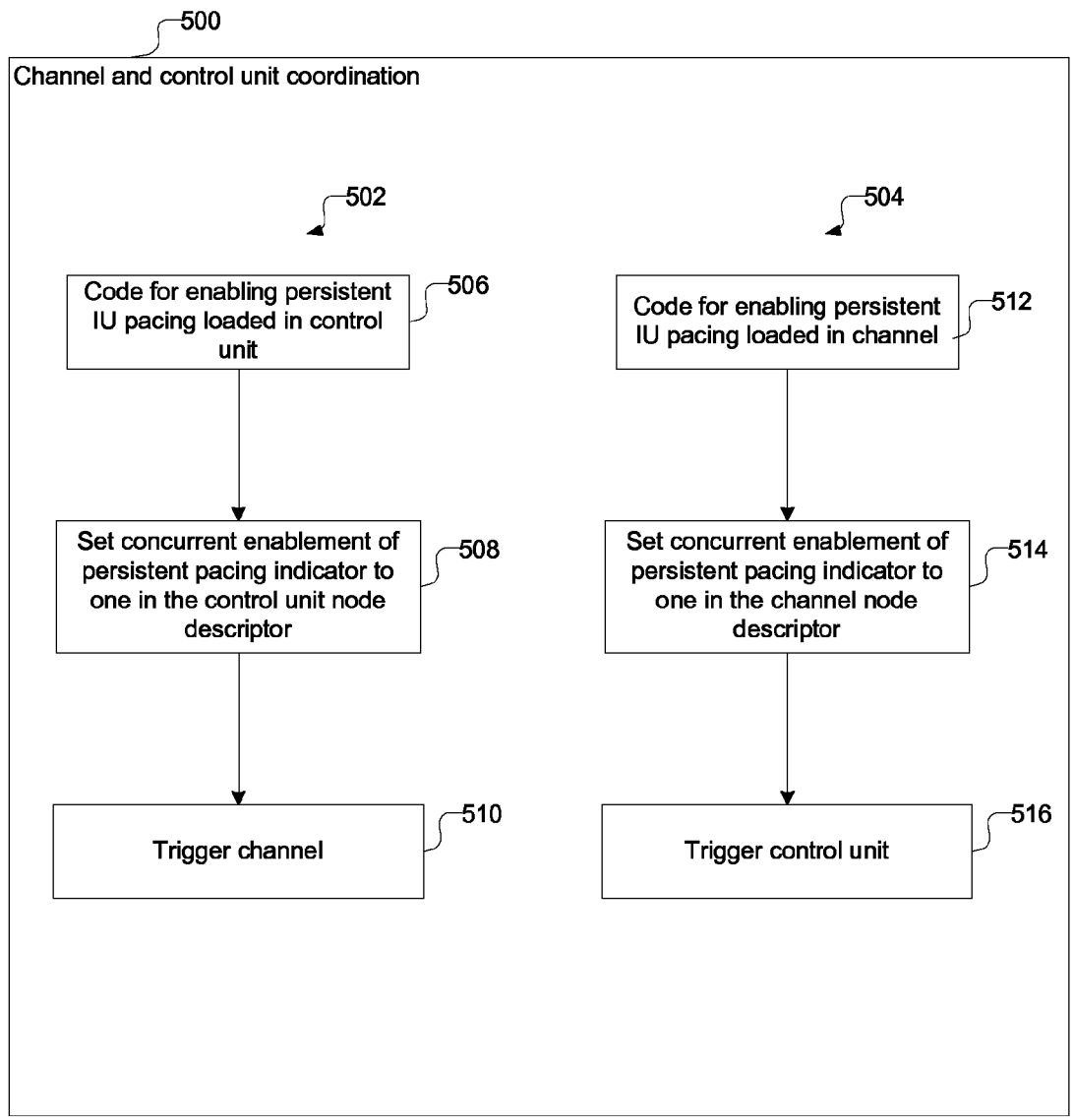
FIG. 5 illustrates triggering of channel and control units, in accordance with certain embodiments.

FIG. 5 describes in a block diagram 500 (via flowcharts 502 and 504) certain embodiments that show how the new bits defined above in FIGS. 2 and 4 may be used for concurrent enablement of persistent IU pacing.

In flowchart 502, control starts at block 506 in which code for enabling persistent IU pacing is loaded in the control unit 302. The control unit 302 sets (at block 508) the concurrent enablement of persistent pacing indicator to one in the control unit node descriptor 312, and then triggers (at block 510) the channel 300 such that the control unit node descriptor 312 can be conveyed to the channel 300.

In flowchart 504, control starts at block 512 in which code for enabling persistent IU pacing is loaded in the channel 300. The channel 300 sets (at block 514) the concurrent enablement of persistent pacing indicator to one in the channel node descriptor 310, and then triggers (at block 516) the control unit 302 with such that the channel node descriptor 310 can be conveyed to the control unit 302. The triggers (reference numerals 510, 516) take place by using the RNID 304, 306 and the RSCN 308 operations, and associated operations, described in FIG. 3.

Figure 6:
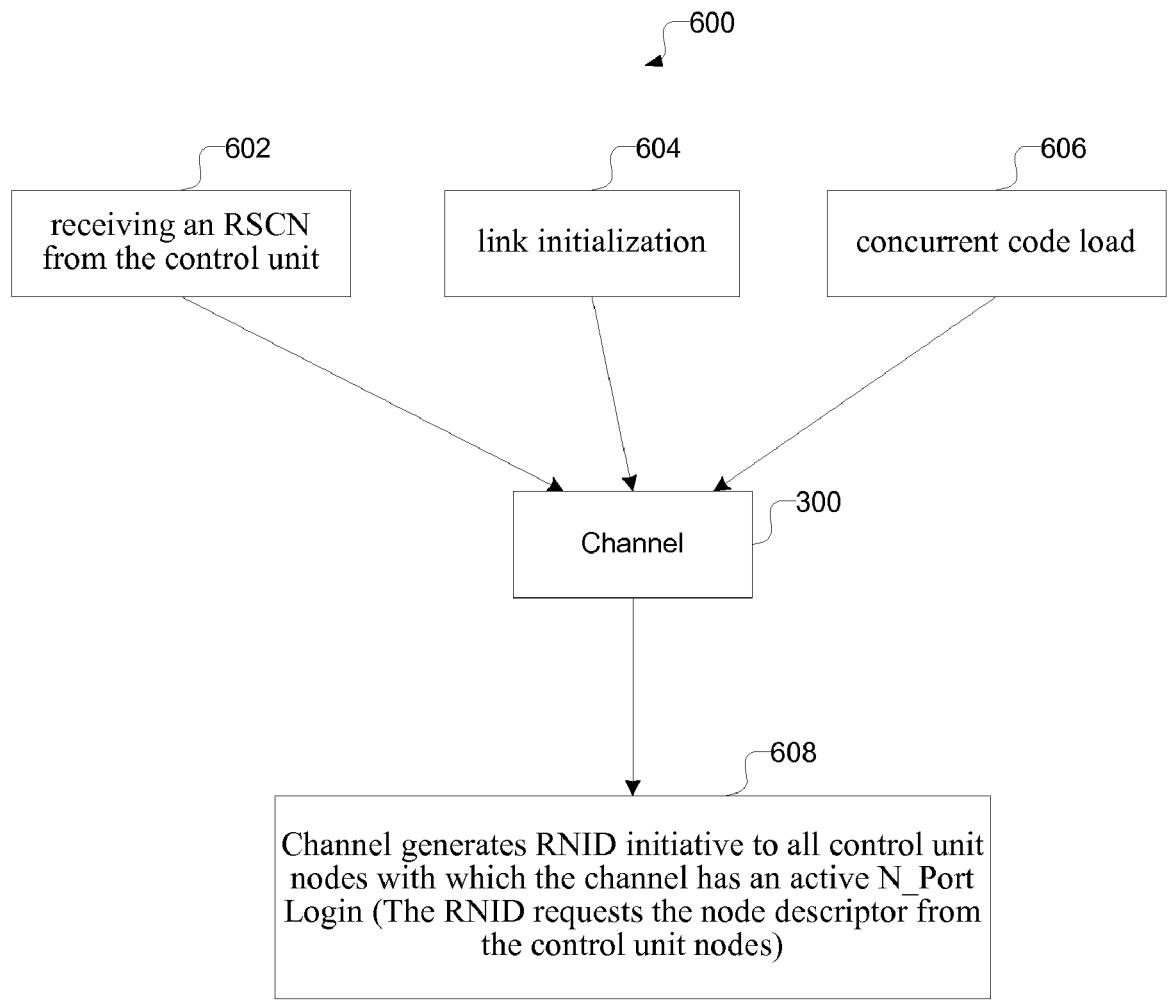
FIG. 6 illustrates events that cause the channel to generate an RNID initiative, in accordance with certain embodiments.

FIG. 6 shows a block diagram 600 that shows that the following events create an initiative for the channel 300 to send RNID directly to a control unit 302 (the RNID requests the control unit 302 for the node descriptor of the control unit 302):

1) Receiving an RSCN, i.e., a state change notification, from the control unit 302 (reference numeral 602); or
2) Link initialization (reference numeral 604); or
3) Concurrent code load (reference numeral 606).

This generates (reference numeral 608) RNID initiative to all control unit nodes with which the channel 608 has an active N_Port Login. The RNID initiative requests node identification data, e.g., the node descriptor 312 of the control unit 302.

In certain embodiments, an RSCN indicates which control units have changed state (affected N-Port IDs). In response to the RSCN 602, the channel 300 may send an RNID to the control units indicated by the RSCN. Also, the control unit 302 does not necessarily send the RSCN to the channel 300. When there is a switch, the control unit 302 may send the RSCN to a fabric controller (to be shown later in FIG. 7, reference numeral 706), and the switch may then broadcast the RSCN to all registered channels. Therefore the RSCN may also come from the fabric (switch). In certain exemplary embodiments, the following operations are performed:

(i) In response to loading (reference numeral 606) code at the channel 300, the channel 300 sends RNID to all control units with which paths are established.

(ii) In response to receiving (reference numeral 602) an RSCN indicating a change in state of a control unit 302 with which the channel 300 has an established logical path, the channel sends (reference numeral 608) an RNID to that control unit 302.

Figure 7:
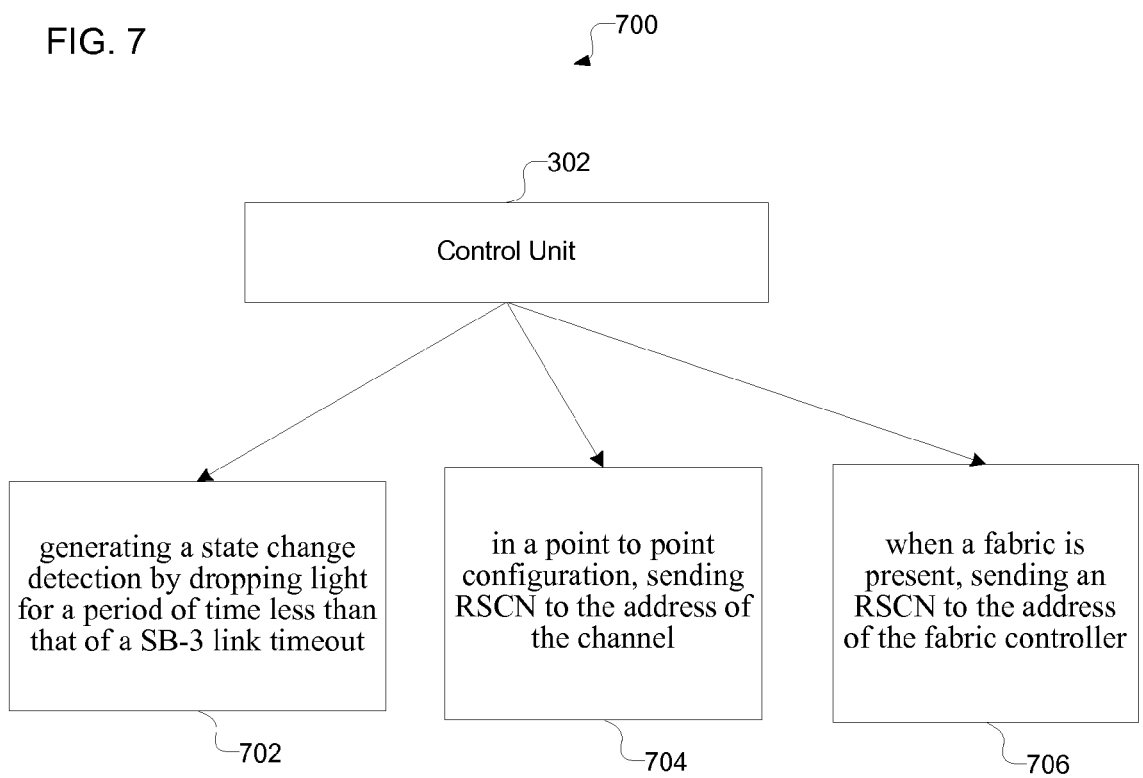
FIG. 7 illustrates operations of the control unit, in accordance with certain embodiments.

FIG. 7 shows a block diagram 700 that shows that the control unit 302 generates an RSCN to the channel 300 by:

1) Generating a state change detection by dropping light for a period of time less than that of a SB-3 link timeout (reference numeral 702); or
2) In a point to point configuration, sending RSCN to the address of the channel (reference numeral 704); or
3) When a fabric is present, sending an RSCN to the address of the fabric controller (reference numeral 706).

Figure 8:
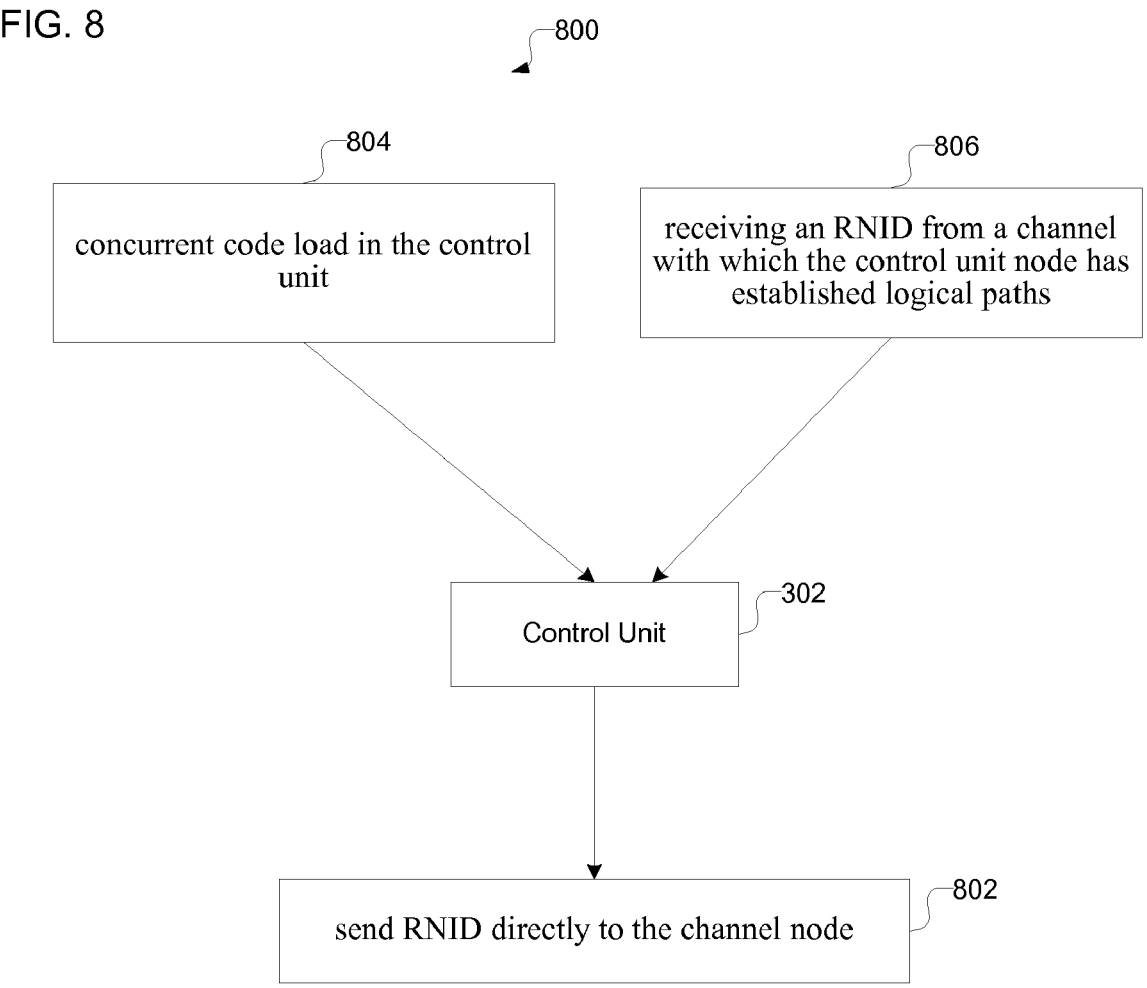
FIG. 8 illustrates events that cause the control unit to send an RNID directly to the channel node, in accordance with certain embodiments.

FIG. 8 shows a block diagram 800 that shows that the following events create an initiative for the control unit 300 to send (reference numeral 802) an RNID directly to the channel node 300:

1) Concurrent code load in the control unit 300 (This generates RNID initiative to all channel nodes with which the control unit 300 an active N_Port Login.) [Reference numeral 804]; or
2) Receiving an RNID from a channel with which the control unit 302 has established logical paths (Reference numeral 806).

When a channel 300 indicates concurrent enablement of Persistent IU Pacing in Node Descriptor byte 1 bit 7 (byte 0 of the Node Parameters) the control unit 302 may internally indicate persistent pacing is enabled for all currently established logical paths with the channel node 300. For paths that are established subsequent to the RNID processing, the Persistent IU Pacing enable bit in the ELP is used to enable or disable persistent pacing.

When a control unit 302 indicates concurrent enablement of Persistent IU Pacing in Node Descriptor byte 1 bit 7 (byte 0 of the Node Parameters) the channel 300 may internally indicate persistent pacing is enabled for all currently established logical paths with the control unit node.

For logical paths that are established subsequent to the RNID processing, the Persistent IU Pacing enable bit in the ELP/LPE (i.e., establish logical path/logical path established) may be used to enable or disable Persistent IU Pacing.

Figure 9:
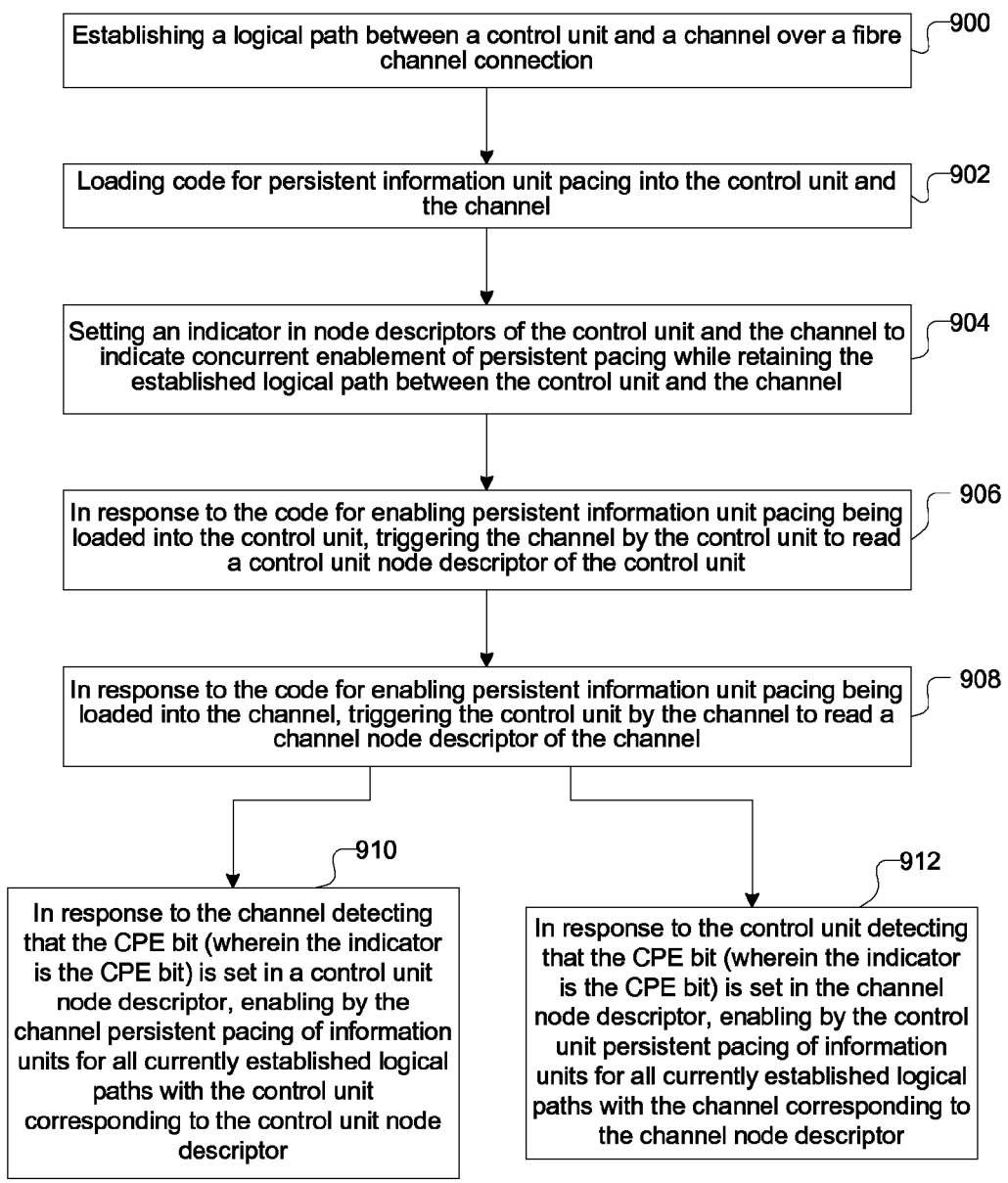
FIG. 9 illustrates operations implemented in the computing environment of FIG. 1, in accordance with certain embodiments.

FIG. 9 illustrates operations implemented in the computing environment of FIG. 1, in accordance with certain embodiments. In the flowchart shown in FIG. 9, control starts at block 900, in which a logical path is established between a control unit 302 and a channel 300 over a fibre channel connection 108. Code for persistent information unit pacing is loaded (at block 902) into the control unit 302 and the channel 300. An indicator 204 is set (at block 904) in node descriptors 310, 312 of the control unit 302 and the channel 300 to indicate concurrent enablement of persistent pacing while retaining the established logical path between the control unit and the channel.

Control proceeds to block 906, in which in response to the code for enabling persistent information unit pacing being loaded into the control unit 302, the channel 300 is triggered by the control unit 302 to read a control unit node descriptor 312 of the control unit 302. In response to the code for enabling persistent information unit pacing being loaded into the channel 300, the control unit 302 is triggered (at block 908) by the channel 300 to read a channel node descriptor 310 of the channel 300.

From block 908, control proceeds in parallel to blocks 910 and 912. At block 910, in response to the channel 300 detecting that the CPE bit (wherein the indicator 204 is the CPE bit) is set in a control unit node descriptor 312, the channel 300 enables persistent pacing of information units for all currently established logical paths with the control unit 302 corresponding to the control unit node descriptor 312. Furthermore, in block 912, in response to the control unit 302 detecting that the CPE bit (wherein the indicator 204 is the CPE bit) is set in the channel node descriptor 310, the control unit 302 enables persistent pacing of information units for all currently established logical paths with the channel 300 corresponding to the channel node descriptor 310.

Therefore, FIGS. 1-9 illustrate how concurrent enablement of persistent information unit pacing is performed in certain embodiments in the computing environment 100 of FIG. 1.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 10:
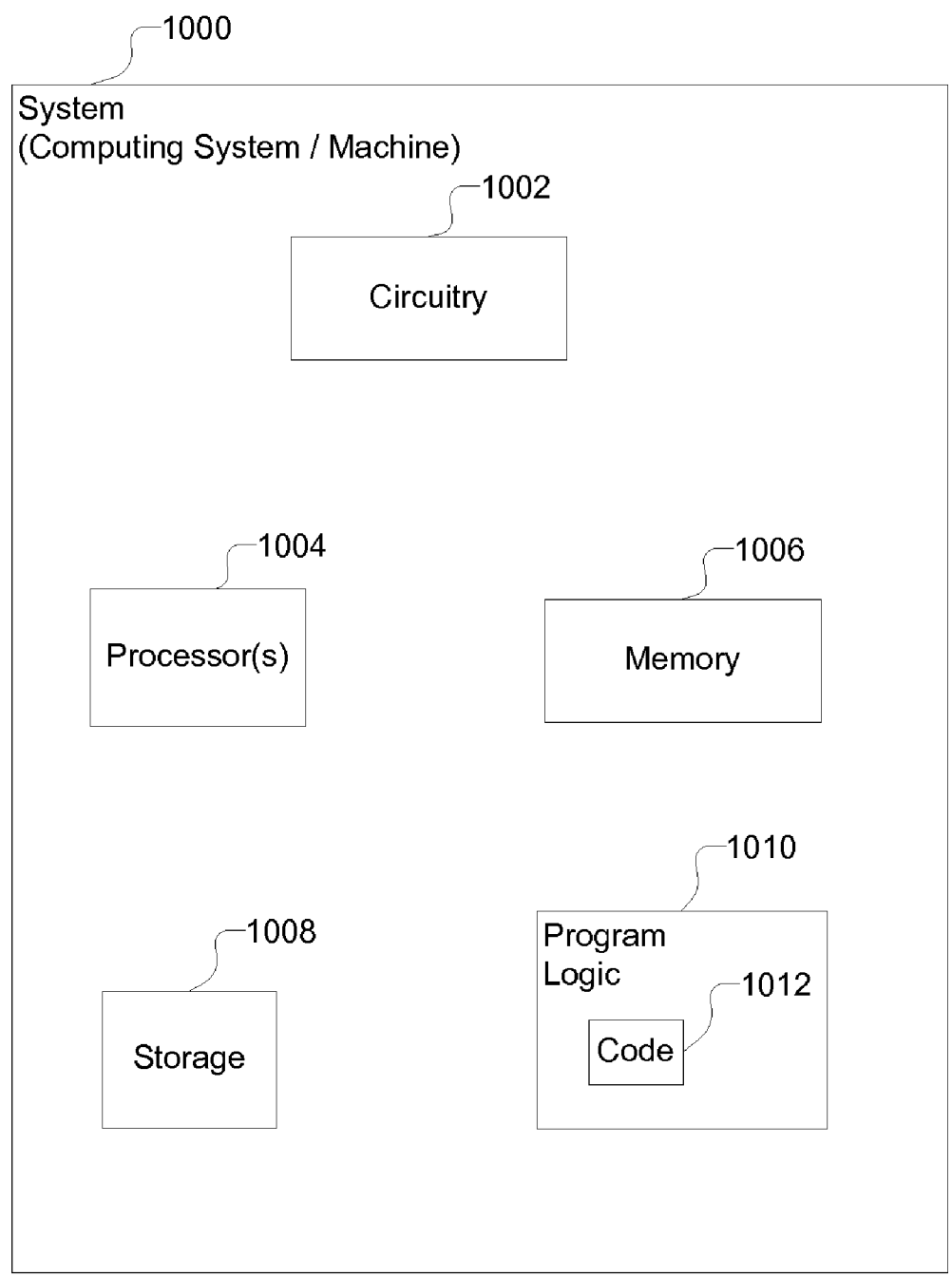
FIG. 10 illustrates the architecture of computing system, wherein in certain embodiments elements of the computing environment of FIG. 1 may be implemented in accordance with the architecture of the computing system.

FIG. 10 illustrates an exemplary computer system 1000, wherein in certain embodiments the remote host 102 and the storage controller 104 of the computing environment 100 of FIG. 1 may be implemented in accordance with the computer architecture of the computer system 1000. The computer system 1000 may also be referred to as a system, and may include a circuitry 1002 that may in certain embodiments include a processor 1004. The system 1000 may also include a memory 1006 (e.g., a volatile memory device), and storage 1008. Certain elements of the system 1000 may or may not be found in the remote host 102 and the storage controller 104 of FIG. 1. The storage 1008 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 1008 may comprise an internal storage device, an attached storage device and/or a network accessible storage device. The system 1000 may include a program logic 1010 including code 1012 that may be loaded into the memory 1006 and executed by the processor 1004 or circuitry 1002. In certain embodiments, the program logic 1010 including code 1012 may be stored in the storage 1008. In certain other embodiments, the program logic 1010 may be implemented in the circuitry 1002. Therefore, while FIG. 10 shows the program logic 1010 separately from the other elements, the program logic 1010 may be implemented in the memory 1006 and/or the circuitry 1002.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in the figures may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-10 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:

establishing a logical path between a control unit and a channel over a fibre channel connection;

in response to the channel detecting that a concurrent persistent information unit pacing enablement bit is set in a control unit node descriptor, enabling by the channel persistent pacing of information units for all currently established logical paths with the control unit corresponding to the control unit node descriptor; and in response to the control unit detecting that the concurrent persistent information unit pacing enablement bit is set in the channel node descriptor, enabling by the control unit persistent pacing of information units for all currently established logical paths with the channel corresponding to the channel node descriptor.

2. The method of claim 1, further comprising:
generating a request node identification data (RNID) initiative to the control unit; and
generating, by the control unit, an RNID to the channel, in response to receiving a request for the RNID from the channel with which the control unit has an already established logical path.

3. The method of claim 1, the method further comprising:
loading code for persistent information unit pacing into the control unit and the channel; and
setting an indicator, in node descriptors of the control unit and the channel to indicate concurrent enablement of persistent pacing while retaining the established logical path between the control unit and the channel, wherein the indicator is the concurrent persistent information unit pacing enablement bit.

4. The method of claim 3, wherein the indicator is a reserved bit in a specific node identification data corresponding to a device-type node and a CPC-type node, wherein the device type node corresponds to the control unit and the CPC-type node corresponds to the channel, wherein the CPC-type node is a central-processor-complex-type node.

5. The method of claim 3, wherein:
in response to the code for enabling persistent information unit pacing being loaded into the control unit, triggering the channel by the control unit to read a control unit node descriptor of the control unit; and
in response to the code for enabling persistent information unit pacing being loaded into the channel, triggering the control unit by the channel to read a channel node descriptor of the channel.

6. A system, comprising:
a memory; and
a processor coupled to the memory, wherein the processor performs operations, the operations comprising:
establishing a logical path between a control unit and a channel over a fibre channel connection;
in response to the channel detecting that a concurrent persistent information unit pacing enablement bit is set in a control unit node descriptor, enabling by the channel persistent pacing of information units for all currently established logical paths with the control unit corresponding to the control unit node descriptor; and
in response to the control unit detecting that the concurrent persistent information unit pacing enablement bit is set in the channel node descriptor, enabling by the control unit persistent pacing of information units for all currently established logical paths with the channel corresponding to the channel node descriptor.

7. The system of claim 6, the operations further comprising:
generating a request node identification data (RNID) initiative to the control unit; and
generating, by the control unit, an RNID to the channel, in response to receiving a request for the RNID from the channel with which the control unit has an already established logical path.

8. The system of claim 6, the operations further comprising:
loading code for persistent information unit pacing into the control unit and the channel; and
setting an indicator, in node descriptors of the control unit and the channel to indicate concurrent enablement of persistent pacing while retaining the established logical path between the control unit and the channel, wherein the indicator is the concurrent persistent information unit pacing enablement bit.

9. The system, of claim 8, wherein the indicator is a reserved bit in a specific node identification data corresponding to a device-type node and a CPC-type node, wherein the device type node corresponds to the control unit and the CPC-type node corresponds to the channel, wherein the CPC-type node is a central-processor-complex-type node.

10. The system of claim 8, wherein:
in response to the code for enabling persistent information unit pacing being loaded into the control unit, triggering the channel by the control unit to read a control unit node descriptor of the control unit; and
in response to the code for enabling persistent information unit pacing being loaded into the channel, triggering the control unit by the channel to read a channel node descriptor of the channel.

11. An article of manufacture, wherein code stored in the article of manufacture when executed by a processor causes operations, the operations comprising:
establishing a logical path between a control unit and a channel over a fibre channel connection;
in response to the channel detecting that a concurrent persistent information unit pacing enablement bit is set in a control unit node descriptor, enabling by the channel persistent pacing of information units for all currently established logical paths with the control unit corresponding to the control unit node descriptor; and
in response to the control unit detecting that the concurrent persistent information unit pacing enablement bit is set in the channel node descriptor, enabling by the control unit persistent pacing of information units for all currently established logical paths with the channel corresponding to the channel node descriptor.

12. The article of manufacture of claim 11, the operations further comprising:
generating a request node identification data (RNID) initiative to the control unit; and
generating, by the control unit, an RNID to the channel, in response to receiving a request for the RNID from the channel with which the control unit has an already established logical path.

13. The article of manufacture of claim 11, the operations further comprising:
loading code for persistent information unit pacing into the control unit and the channel; and
setting an indicator, in node descriptors of the control unit and the channel to indicate concurrent enablement of persistent pacing while retaining the established logical path between the control unit and the channel, wherein the indicator is the concurrent persistent information unit pacing enablement bit.

14. The article of manufacture of claim 13, wherein the indicator is a reserved bit in a specific node identification data corresponding to a device-type node and a CPC-type node, wherein the device type node corresponds to the control unit and the CPC-type node corresponds to the channel, wherein the CPC-type node is a central-processor-complex -type node.

15. The article of manufacture of claim 13, wherein:
in response to the code for enabling persistent information unit pacing being loaded into the control unit, triggering the channel by the control unit to read a control unit node descriptor of the control unit; and
in response to the code for enabling persistent information unit pacing being loaded into the channel, triggering the control unit by the channel to read a channel node descriptor of the channel.

16. A method for deploying computing infrastructure, comprising integrating computer-readable code into a computing system, wherein the computer-readable code in combination with the computing system is capable of performing:

establishing a logical path between a control unit and a channel over a fibre channel connection;

in response to the channel detecting that a concurrent persistent information unit pacing enablement bit is set in a control unit node descriptor, enabling by the channel persistent pacing of information units for all currently established logical paths with the control unit corresponding to the control unit node descriptor; and in response to the control unit detecting that the concurrent persistent information unit pacing enablement bit is set in the channel node descriptor, enabling by the control unit persistent pacing of information units for all currently established logical paths with the channel corresponding to the channel node descriptor.

17. The method for deploying computing infrastructure of claim 16, wherein the computer-readable code in combination with the computing system is further capable of performing:

generating a request node identification data (RNID) initiative to the control unit; and generating, by the control unit, an RNID to the channel, in response to receiving a request for the RNID from the channel with which the control unit has an already established logical path.

18. The method for deploying computing infrastructure of claim 16, wherein the computer-readable code in combination with the computing system is further capable of performing:

loading code for persistent information unit pacing into the control unit and the channel; and setting an indicator, in node descriptors of the control unit and the channel to indicate concurrent enablement of persistent pacing while retaining the established logical path between the control unit and the channel, wherein the indicator is the concurrent persistent information unit pacing enablement bit.

19. The method for deploying computing infrastructure of claim 18, wherein the indicator is a reserved bit in a specific node identification data corresponding to a device-type node and a CPC-type node, wherein the device type node corresponds to the control unit and the CPC-type node corresponds to the channel, wherein the CPC-type node is a central-processor-complex-type node.

20. The method for deploying computing infrastructure of claim 18, wherein:

in response to the code for enabling persistent information unit pacing being loaded into the control unit, triggering the channel by the control unit to read a control unit node descriptor of the control unit; and in response to the code for enabling persistent information unit pacing being loaded into the channel, triggering the control unit by the channel to read a channel node descriptor of the channel.

* * * * *